(12) United States Patent
Sato et al.

(10) Patent No.: US 11,005,121 B2
(45) Date of Patent: May 11, 2021

(54) GASKET AND FUEL CELL STACK

(71) Applicant: TOYOTA JIDOSHA KABUSHIKI KAISHA, Toyota (JP)

(72) Inventors: Kenji Sato, Kasugai (JP); Hideya Kadono, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 484 days.

(21) Appl. No.: 15/722,254

(22) Filed: Oct. 2, 2017

(65) Prior Publication Data

US 2018/0115007 A1   Apr. 26, 2018

(30) Foreign Application Priority Data

Oct. 25, 2016   (JP) .............................. JP2016-208317

(51) Int. Cl.

| | |
|---|---|
| *H01M 2/20* | (2006.01) |
| *H01M 8/24* | (2016.01) |
| *H01M 8/242* | (2016.01) |
| *H01M 8/2465* | (2016.01) |
| *H01M 8/241* | (2016.01) |
| *H01M 8/0276* | (2016.01) |

(Continued)

(52) U.S. Cl.
CPC ......... *H01M 8/242* (2013.01); *H01M 8/0247* (2013.01); *H01M 8/0265* (2013.01); *H01M 8/0276* (2013.01); *H01M 8/241* (2013.01); *H01M 8/2457* (2016.02); *H01M 8/2465* (2013.01); *H01M 8/2483* (2016.02); *H01M 8/2485* (2013.01); *H01M 2008/1095* (2013.01)

(58) Field of Classification Search
None
See application file for complete search history.

(56) References Cited

U.S. PATENT DOCUMENTS

| | | | |
|---|---|---|---|
| 6,057,054 A | 5/2000 | Barton et al. | |
| 6,337,120 B1 | 1/2002 | Sasaki et al. | |

(Continued)

FOREIGN PATENT DOCUMENTS

| | | |
|---|---|---|
| CN | 1567612 A | 1/2005 |
| CN | 101076909 A | 11/2007 |

(Continued)

OTHER PUBLICATIONS

Jun. 30, 2020 Partial Translation of Office Action issued in Chinese Patent Application No. 201710992401.3.

*Primary Examiner* — Cynthia H Kelly
*Assistant Examiner* — Julian Anthony
(74) *Attorney, Agent, or Firm* — Oliff PLC

(57) ABSTRACT

A sealing part has an outer peripheral point of the sealing part within a range from 0 degree to 90 degrees around a center point of the sealing part relative to a stacking direction, and that is located at a distance of a first length L1 from the center point. Each point on the outer peripheral line within a first range satisfies L2≤L1, where L2 is a second length that is a distance from the center point to that point. Each point on the outer peripheral line within a second range satisfies L3<L1, where L3 is a distance from the center point to that point, and is located on the opposite side of the outer peripheral point from the center point or at the same position as the outer peripheral point in the direction perpendicular to the stacking direction.

9 Claims, 10 Drawing Sheets

(51) Int. Cl.
*H01M 8/0247* (2016.01)
*H01M 8/2485* (2016.01)
*H01M 8/2457* (2016.01)
*H01M 8/2483* (2016.01)
*H01M 8/0265* (2016.01)
H01M 8/1018 (2016.01)

(56) References Cited

U.S. PATENT DOCUMENTS

| | | | |
|---|---|---|---|
| 2008/0118811 A1* | 5/2008 | Okabe | H01M 8/0247 |
| | | | 429/483 |
| 2010/0209798 A1 | 8/2010 | Nunokawa et al. | |
| 2011/0318665 A1 | 12/2011 | Yamamoto et al. | |
| 2015/0295267 A1 | 10/2015 | Kageyama et al. | |
| 2015/0349355 A1 | 12/2015 | Goto et al. | |
| 2015/0380694 A1 | 12/2015 | Kadono et al. | |

FOREIGN PATENT DOCUMENTS

| | | |
|---|---|---|
| CN | 104798238 A | 7/2015 |
| CN | 105280933 A | 1/2016 |
| JP | 2006-004851 A | 1/2006 |
| JP | 2007-333126 A | 12/2007 |
| JP | 2008-311158 A | 12/2008 |
| JP | 2010-112401 A | 5/2010 |
| JP | 4573021 B2 | 11/2010 |
| WO | 2010/100906 A1 | 9/2010 |

\* cited by examiner

THIRD REFERENCE EXAMPLE

FOURTH REFERENCE EXAMPLE

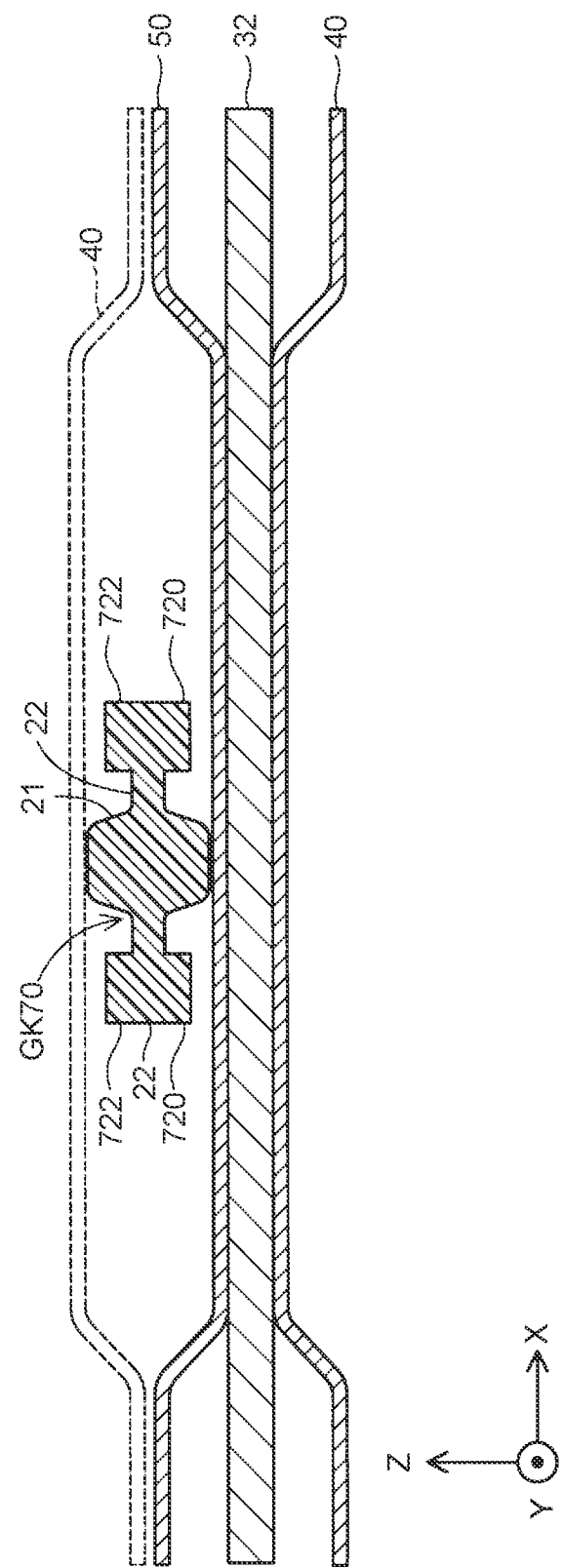

GASKET AND FUEL CELL STACK

INCORPORATION BY REFERENCE

The disclosure of Japanese Patent Application No. 2016-208317 filed on Oct. 25, 2016 including the specification, drawings and abstract is incorporated herein by reference in its entirety.

BACKGROUND

1. Technical Field

The present disclosure relates to a gasket used for a fuel cell stack and to a fuel cell stack.

2. Description of Related Art

A typical fuel cell stack has a stack structure in which a plurality of cells is stacked. Each cell has a membrane electrode assembly and two separators holding the membrane electrode assembly therebetween. The separator has a reactant gas flow path, a coolant flow path, a reactant gas manifold, and a coolant manifold formed therein, and therefore gaskets that prevent leakage of fluids are provided as necessary around these flow paths and manifolds. Japanese Patent Application Publication No. 2006-4851 discloses an unbonded-type gasket having a main lip that comes in close contact with a separator.

SUMMARY

When a compressive force is applied in a direction intersecting the stacking direction in a configuration employing the gasket of the above related art, the main lip protruding in the stacking direction may be displaced from a surface of the separator as the gasket inclines around an axis in a length direction thereof. In this case, the gasket cannot apply a sufficient contact pressure between the cells of the fuel cell stack, and therefore cannot maintain the adequate sealing performance. Thus, there has been a demand for a technique that can maintain the adequate sealing performance of an unbonded-type gasket.

A first aspect of the present disclosure relates to a gasket that is disposed unbonded between separators of two cells of a fuel cell stack adjacent to each other in a stacking direction and seals a gap between these separators. The gasket has a sealing part that comes in close contact with the two separators. In a cross-section perpendicular to a length direction of the sealing part, the sealing part has an outer peripheral point that is one point on an outer peripheral line of the sealing part within a right angular range from 0 degree to 90 degrees around a center point of the sealing part relative to the stacking direction, and that is located at a distance of a first length $L1$ from the center point. Each point on the outer peripheral line within a first angular range defined by the stacking direction and a first direction oriented from the center point toward the outer peripheral point satisfies a relation $L2 \leq L1$, where $L2$ is a second length that is a distance from the center point to that the each point. Each point on the outer peripheral line within a second angular range defined by the first direction and a direction perpendicular to the stacking direction satisfies a relation $L3 < L1$, where $L3$ is a distance from the center point to the each point, and is located on the opposite side of the outer peripheral point from the center point or at the same position as the outer peripheral point in the direction perpendicular to the stacking direction.

According to this gasket, the outer peripheral point is present within the right angular range from 0 degree to 90 degrees, and the length (distance) $L2$ from the center point to each point on the outer peripheral line within the first angular range located on the side of 0 degree from the outer peripheral point is equal to or shorter than the length (distance) $L1$ from the center point to the outer peripheral point. Thus, in the outer peripheral line within the first angular range, the outer peripheral point is a point that is farthest away from the center point. When the gasket inclines around an axis in the length direction, this inclination can cause a direction from the outer peripheral point toward the center point to approach a compression direction of the gasket. Accordingly, even when the gasket has inclined, a sufficient thickness that contributes to the sealing performance can be maintained. Moreover, according to this gasket, the distance $L3$ from the center point to each point on the outer peripheral line within the second angular range located on the side of 90 degrees from the outer peripheral point is shorter than the length (distance) $L1$ from the center point to the outer peripheral point, and each point is located on the opposite side of the outer peripheral point from the center point or at the same position as the outer peripheral point in the direction perpendicular to the stacking direction. Thus, the gasket material can be reliably packed in a compression area as seen from above in the compression direction. Accordingly, a decrease in reaction force upon compression can be prevented. Thus, even when it has inclined, this gasket can maintain a portion that comes in close contact with the separator and prevent a decrease in reaction force upon compression. Effects are thereby achieved that a sufficient contact pressure can be applied between separators of fuel cell stack and that the adequate sealing performance can be maintained.

The outer peripheral point may be a point that is farthest away from the center point in a sequence of points composing the outer peripheral line of the sealing part. Thus, a portion that comes in close contact with the separator when the gasket inclines can be more reliably maintained.

The outer peripheral line of the sealing part may have an arc-shaped segment that is centered at the center point and has a radius of the first length, and the outer peripheral point may be a point that is farthest away from the center point in the direction perpendicular to the stacking direction in a sequence of points composing the arc-shaped segment. Thus, a portion that comes in close contact with the separator when the gasket inclines can be maintained in the form of the arc-shaped segment.

The points on the outer peripheral line within the second angular range may be so located that a distance from the center point in the direction perpendicular to the stacking direction increases gradually as a distance from the center point in the stacking direction decreases. Thus, the gasket has a simple shape and yet can maintain the adequate sealing performance.

The sealing part may include an O-ring portion having a circular cross-sectional shape and first protrusions provided on an outer periphery of the O-ring portion, and the outer peripheral point may be an apex of each of the first protrusions. Thus, the outer peripheral point can be easily obtained, and the adequate sealing performance can be maintained.

When a plane of coordinates having an origin at the center point is assumed in the cross-section, the right angular range may correspond to a first quadrant located on an upper right side in the plane of coordinates, and a portion of the sealing part included in a second quadrant located on an upper left side may be line-symmetrical with a portion of the sealing part included in the first quadrant. Thus, the outer peripheral point can be obtained in each of the first-quadrant portion and the second-quadrant portion, so that more adequate sealing performance can be maintained.

The gasket may further include plate-shaped peripheral edges that are provided one on each side of the sealing part in the direction perpendicular to the stacking direction, and the outer peripheral line within the second angular range may not include a portion of the sealing part at which the peripheral edge is connected. Thus, the gasket can be prevented from inclining around the axis in the length direction as the peripheral edge hits the separator.

The gasket may further include a second protrusion that protrudes in the stacking direction from a surface of the peripheral edge. Thus, the gasket can be further prevented from inclining around the axis in the length direction as the second protrusion hits the separator.

A second aspect of the present disclosure relates to a fuel cell stack in which a plurality of cells are stacked in a stacking direction. This fuel cell stack includes the gasket of the first aspect. According to this fuel cell stack, the gap between the separators can be sufficiently sealed even when the gasket has inclined.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 14 is a view illustrating a part of a gasket in a modified example of the third embodiment.

DETAILED DESCRIPTION OF EMBODIMENTS

A. First Embodiment

A-1. Overall Configuration of Fuel Cell System

Figure 1:
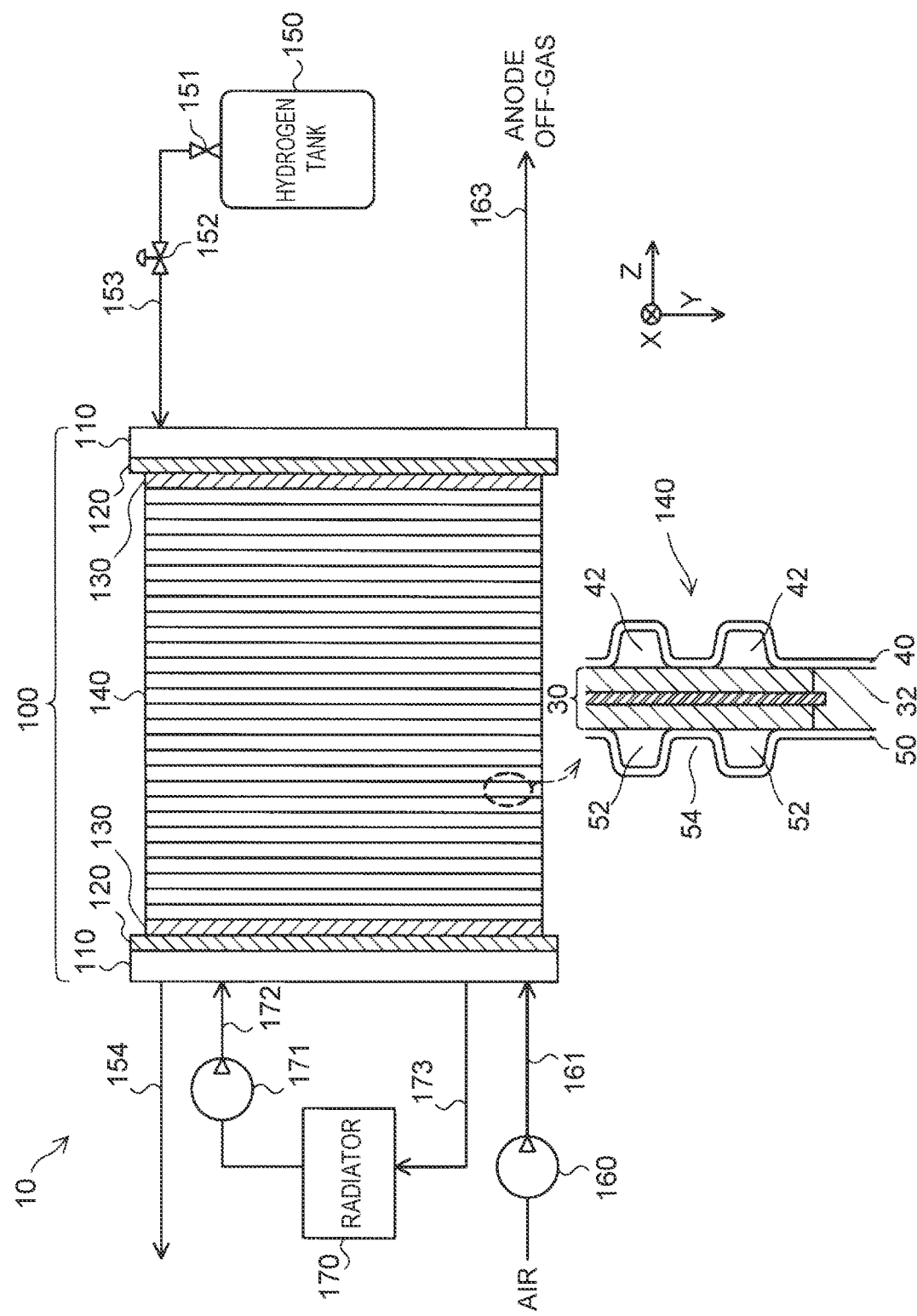
FIG. 1 is a view illustrating a schematic configuration of a fuel cell system in a first embodiment of the present disclosure.

FIG. 1 is a view illustrating a schematic configuration of a fuel cell system 10 in a first embodiment of the present disclosure. The fuel cell system 10 includes a fuel cell stack 100. The fuel cell stack 100 has a stack structure in which an end plate 110, an electric insulating plate 120, a current collector 130, a plurality of cells 140 of a fuel cell stack 100, a current collector 130, an electric insulating plate 120, and an end plate 110 are stacked in the order mentioned. A stacking direction of the cells 140 is a direction Z perpendicular to a vertical direction Y. The components between one end plate 110 and the other end plate 110 are fastened together with a compressive force applied thereto by four fastening bolts (not shown).

Hydrogen as a fuel gas is supplied to the fuel cell stack 100 from a hydrogen tank 150 storing high-pressure hydrogen through a shut-off valve 151, a regulator 152, and a pipe 153. A remainder of the fuel gas (anode off-gas) that has not been used in the fuel cell stack 100 is discharged to an outside of the fuel cell stack 100 through a discharge pipe 163. Alternatively, the fuel cell system 10 may have a recirculation mechanism that recirculates the anode off-gas toward the pipe 153. Air as an oxidant gas is also supplied to the fuel cell stack 100 through an air pump 160 and a pipe 161. A remainder of the oxidant gas (cathode off-gas) that has not been used in the fuel cell stack 100 is discharged to the outside of the fuel cell stack 100 through a discharge pipe 154. The fuel gas and the oxidant gas are also called reactant gases.

Moreover, to cool the fuel cell stack 100, a coolant cooled by a radiator 170 is supplied to the fuel cell stack 100 through a water pump 171 and a pipe 172. The coolant discharged from the fuel cell stack 100 circulates through the pipe 173 to the radiator 170. For example, water, unfreezable water such as ethylene glycol, or air is used as the coolant. In this example, water is used as the coolant.

Each cell 140 of the fuel cell stack 100 has a configuration in which a membrane electrode assembly (also called an MEA) 30 composed of an electrolyte membrane and an anode and a cathode disposed respectively on both sides thereof is held between a pair of separators, namely, an anode-side separator 50 and a cathode-side separator 40. The anode-side separator 50 includes a plurality of thin linear fuel gas flow grooves 52 in a surface facing the MEA 30, and includes a plurality of thin linear coolant flow grooves 54 in a surface facing the opposite side from the MEA 30. The cathode-side separator 40 includes a plurality of thin linear oxidant gas flow grooves 42 in a surface facing the MEA 30. A resin frame member 32 having an insulating property is provided on an outer periphery of the MEA 30 held between the anode-side separator 50 and the cathode-side separator 40.

Figure 2:
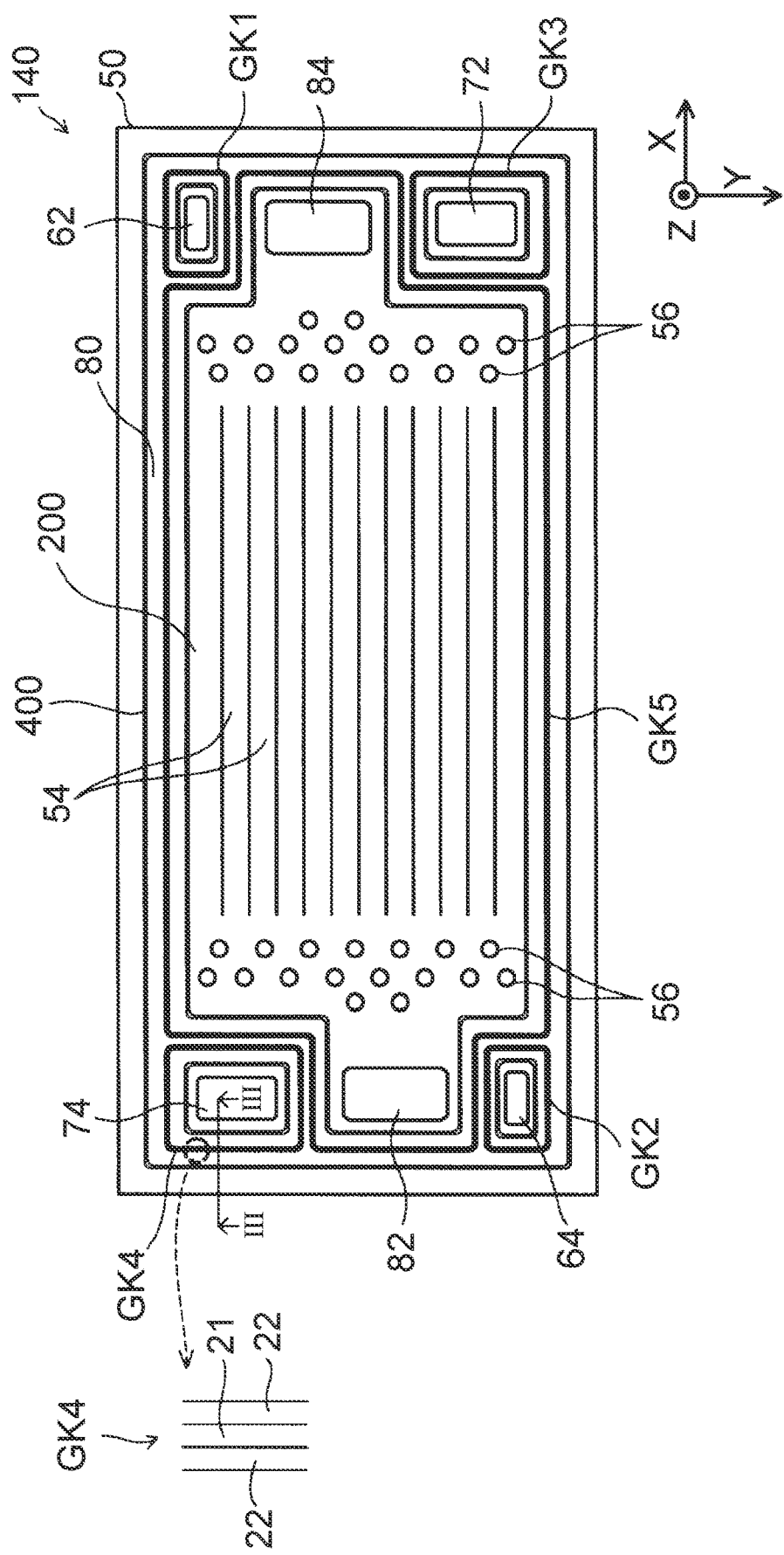
FIG. 2 is a schematic plan view of an anode-side separator of a cell as seen from the opposite side from a membrane electrode assembly (MEA)

FIG. 2 is a schematic plan view of the anode-side separator 50 of the cell 140 as seen from the opposite side from the MEA 30. In FIG. 2, a front-rear direction is the stacking direction Z, and an upper-lower direction is the vertical direction Y. In this specification, the vertical direction Y includes a direction of gravity and the opposite direction from the direction of gravity. A left-right direction in FIG. 2 perpendicular to the vertical direction Y and the stacking direction Z is a horizontal direction X. The anode-side separator 50 and the cathode-side separator 40 are formed by members that can shut off gas and conduct electrons; for example, these separators are formed by carbon members made of dense carbon obtained by compressing carbon particles so as not to allow gas permeation, or by pressed metal members made of stainless steel, titanium steel, or the like. In this embodiment, the separators 40, 50 are pressed metal separators.

At one end edge of the anode-side separator 50 in the horizontal direction X, a fuel gas inlet manifold 62, a coolant outlet manifold 84, and an oxidant gas inlet manifold 72 are disposed in this order from above along the vertical direction Y. At the other end edge, an oxidant gas outlet manifold 74, a coolant inlet manifold 82, and a fuel gas outlet manifold 64 are disposed in this order from above along the vertical direction Y. The fuel gas inlet manifold 62 and the fuel gas outlet manifold 64 are disposed respectively at outer edges on both sides in the horizontal direction X so as to be point-symmetrical. The oxidant gas inlet manifold 72 and the oxidant gas outlet manifold 74 are disposed respectively at the outer edges on both sides in the horizontal direction X so as to be point-symmetrical. The coolant inlet manifold 82 and the coolant outlet manifold 84 are disposed respectively at the outer edges on both sides in the horizontal direction X so as to be point-symmetrical.

The fuel gas supplied from the fuel gas inlet manifold 62 is distributed into the fuel gas flow grooves 52 (FIG. 1) of the cell 140, and then the remainder of the fuel gas that has not been used in the fuel gas flow grooves 52 is collected by the fuel gas outlet manifold 64 and discharged to the outside of the fuel cell stack 100. The oxidant gas supplied from the oxidant gas inlet manifold 72 is distributed into the oxidant gas flow grooves 42 (FIG. 1) of the cell 140, and then the remainder of the oxidant gas that has not been used in the oxidant gas flow grooves 42 is collected by the oxidant gas outlet manifold 74 and discharged to the outside of the fuel cell stack 100.

Moreover, the coolant supplied from the coolant inlet manifold 82 is diffused through one end of the anode-side separator 50 where dimples 56 are provided, and flows through the coolant flow grooves 54. Then, this coolant is collected by the coolant outlet manifold 84 from the coolant flow grooves 54 through the other end of the anode-side separator 50 where dimples 56 are provided, and is discharged to the outside of the fuel cell stack 100. In a flat surface of the anode-side separator 50 seen from the opposite side from the MEA 30, the coolant inlet manifold 82, the coolant flow grooves 54, and the coolant outlet manifold 84 communicate with one another in the horizontal direction X and compose a coolant flow path surface 200. Openings of the manifolds 62, 64, 72, 74, 82, 84 have substantially rectangular shapes. These manifolds each have a shape extending in the stacking direction Z of the fuel cell stack 100.

Gaskets GK1 to GK5 that surround the manifolds 62, 64, 72, 74 and the coolant flow path surface 200, respectively, are formed in the flat surface of the anode-side separator 50 seen from the opposite side from the MEA 30. The gaskets GK1 to GK5 are seal materials that each form a closed linear seal line (i.e., ends of the seal line coincide with each other), and when the plurality of cells 140 are stacked, come in contact with a surface of adjacent another cell 140 and seal a gap between the two cells 140. Specifically, the gaskets GK1, GK2 prevent leakage of the fuel gas, the gaskets GK3, GK4 prevent leakage of the oxidant gas, and the gasket GK5 prevents leakage of the coolant. The gaskets GK1 to GK5 are formed by injection molding, pressing, etc., and rubber, thermoplastic elastomer, etc. can be used as the material of the gaskets GK1 to GK5. Grooves 80 are formed in regions (portions of the flat surface of the anode-side separator 50 seen from the opposite side from the MEA 30) where the gaskets GK1 to GK5 are disposed. The gaskets GK1 to GK5 have no cavity.

A-2. Configuration of Gasket

A plan view of the gasket GK4 formed near the oxidant gas outlet manifold 74 of the anode-side separator 50 is shown in FIG. 2. The gasket GK4 extends in a direction along the seal line, and includes a central sealing part 21 near a center of the seal line in a width direction, and includes peripheral edges 22 on each side of the central sealing part 21 (see FIG. 3). The central sealing part 21 and the peripheral edges 22 are integrally formed.

Figure 3:
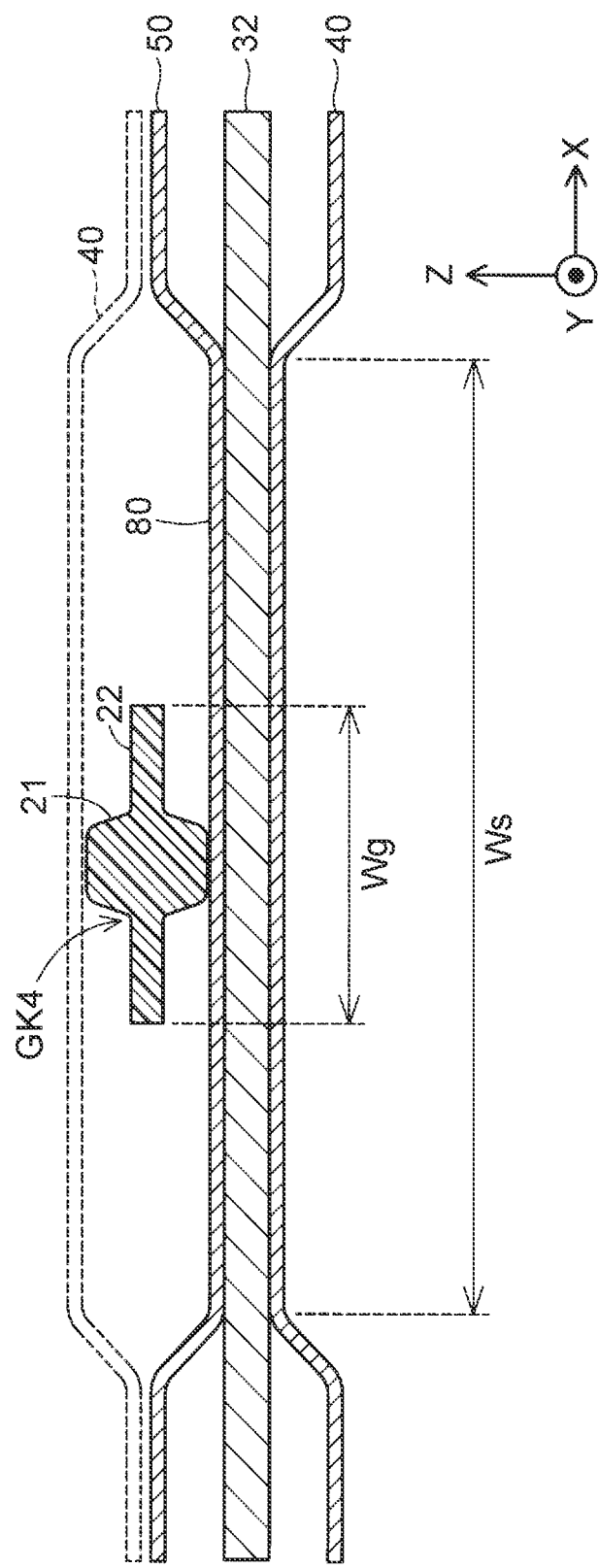
FIG. 3 is a view illustrating the section III-III of the anode-side separator shown in FIG. 2.

FIG. 3 is a view illustrating the section A-A of the anode-side separator 50 shown in FIG. 2. The section A-A is a section of the gasket GK4 perpendicular to a length direction (a direction in which the linear gasket extends). In a state where the plurality of cells 140 (FIG. 2) are stacked, the central sealing part 21 of the gasket GK4 functions so as to come in close contact with the anode-side separator 50 of one cell 140 of two adjacent cells 140 and the cathode-side separator 40 of the other cell 140. The peripheral edges 22 of the gasket GK4 have a flat plate shape, and are connected to both sides of the central sealing part 21 in the horizontal direction X, near a center of the central sealing part 21 in the stacking direction Z. The peripheral edges 22 have a smaller thickness than the central sealing part 21. In this specification, a thickness means a dimension in the stacking direction Z of the cells 140. A width Wg of the gasket GK4 is smaller than a width Ws of the groove 80, so that the gasket GK4 is disposed inside the groove 80. The shape characteristics of the gasket GK4 are the same as those of the other gaskets GK1 to GK3 and GK5.

To assemble the fuel cell stack 100, in a state where the gaskets GK1 to GK5 are disposed in the grooves 80 formed in the anode-side separator 50 of the cell 140, the cathode-side separator 40 of an adjacent another cell 140 is placed on the anode-side separator 50. FIG. 3 shows a state immediately before the cathode-side separator 40 is placed. In FIG. 3, the cathode-side separator 40 of the adjacent other cell 140 is indicated by the dashed lines. At this point, the central sealing part 21 of the gasket GK4 is in contact with the cathode-side separator 40 and the anode-side separator 50.

Figure 4:
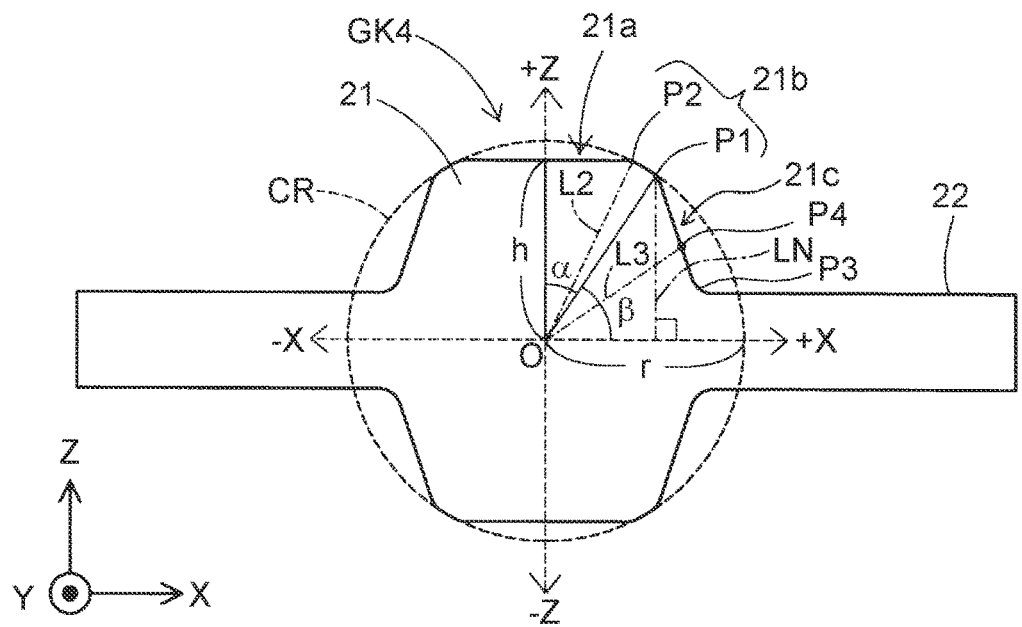
FIG. 4 is a view illustrating a cross-section of a gasket perpendicular to a length direction.

FIG. 4 is a view illustrating a cross-section of the gasket GK4 perpendicular to the length direction. For the convenience of illustration, hatching indicating a cross-section is omitted. In the cross-section perpendicular to the length direction, the central sealing part 21 of the gasket GK4 has the following shape characteristics. The central sealing part 21 can be regarded as the "sealing part" in the first aspect of the present disclosure described in the section "Summary."

A plane of coordinates along the cross-section is divided by a coordinate axis extending along the horizontal direction X (hereinafter referred to as an "X-coordinate axis") and a coordinate axis extending along the stacking direction Z (hereinafter referred to as a "Z-coordinate axis") into a first quadrant (a portion where X>0 and Z>0), a second quadrant (a portion where X<0 and Z>0), a third quadrant (a portion where X<0 and Z<0), and a fourth quadrant (a portion where X>0 and Z<0). An origin at which the X-coordinate axis and the Z-coordinate axis intersect each other coincides with a center point O of the cross-section of the central sealing part 21.

Of the central sealing part 21, the first-quadrant portion and the second-quadrant portion are line-symmetrical with respect to the Z-coordinate axis, the first-quadrant portion and the third-quadrant portion are point-symmetrical with respect to the center point O, and the first-quadrant portion and the fourth-quadrant portion are line-symmetrical with respect to the X-coordinate axis. In the following, the first-quadrant portion will be described as a representative of the second- to fourth-quadrant portions.

As described above, the first quadrant is the portion where X>0 and Z>0. In other words, the first quadrant is the portion within an angular range (right angular range) from 0 degree to 90 degrees in a clockwise direction with reference to a plus side of the Z-coordinate axis (hereinafter referred to as a "+Z-coordinate axis") in the cross-section of the central sealing part 21 perpendicular to the length direction. The first-quadrant portion can be regarded as the portion "within the right angular range" in the first aspect of the present disclosure.

In the first-quadrant portion, an outer periphery (outer peripheral line) of the central sealing part 21 includes an outer peripheral upper segment 21a, an outer peripheral intermediate segment 21b, and an outer peripheral side segment 21c.

The outer peripheral upper segment 21a is a part located on an upper side in FIG. 4 in the stacking direction Z (+Z side), and has a straight linear shape parallel to the X-coordinate axis. Thus, the outer peripheral upper segment 21a has a flat shape parallel to an X-Y plane. A distance between the outer peripheral upper segment 21a and the X-coordinate axis is h.

The outer peripheral intermediate segment 21b is a part that is continuous with an end of the outer peripheral upper segment 21a on a +X-side (a plus side in the direction of the X-coordinate axis; the same applies hereinafter), and is a round corner of the central sealing part 21. Specifically, the outer peripheral intermediate segment 21b is a part from a point P1 to a point P2 on the outer peripheral line of the central sealing part 21, and has a shape extending along an arc that is centered at the center point O and has a radius r. The radius r is longer than the distance h. The point P1 that is an end of the outer peripheral intermediate segment 21b on the +X-side is located at a position of an angle α in the clockwise direction relative to the +Z-coordinate axis. The angle α is 35 degrees, for example. However, 35 degrees is merely an example, and this angle can be changed to various values. The point P1 can be regarded as the "outer peripheral point" in the first aspect of the present disclosure.

A circle CR indicated by the dashed line in FIG. 4 is a circle that is centered at the center point O and has the radius r. The outer peripheral intermediate segment 21b extends along a part of the circle CR, and the outer peripheral upper segment 21a is located on an inner side (on the side of the center point O) of the circle CR. Thus, each point (e.g., the point P2) on the outer peripheral line within an angular range (the part indicated by a in FIG. 4) defined by the +Z-coordinate axis and a direction oriented from the center point O toward the point P1 satisfies a relation expressed by the following Formula (1). This angular range can be regarded as the "first angular range" in the first aspect of the present disclosure, and will be hereinafter referred to as a "first angular range α."

$$L2 \leq r \quad (1)$$

Here, L2 is a distance from the center point O to the point P2. As described above, r is the distance from the center point O to the point P1, and can be regarded as the "first length L1" in the first aspect of the present disclosure.

The outer peripheral side segment 21c is a part that is continuous with the point P1 being an end of the outer peripheral intermediate segment 21b on the +X-side, and that serves as the outer peripheral line within an angular range (a range β in FIG. 4) defined by the +X-coordinate axis and the direction oriented from the center point O toward the point P1. This angular range can be regarded as the "second angular range" in the first aspect of the present disclosure, and hereinafter will be referred to as a "second angular range β." A part of the outer peripheral line of the gasket GK4 in the first quadrant that is occupied by the outer peripheral line of the central sealing part 21 within the second angular range β is the part from the point P1 to a point P3. The point P3 is a border point between the central sealing part 21 and the peripheral edge 22. The part from the point P1 to the point P3 is the part serving as the outer peripheral line within the second angular range β. In this specification, the outer peripheral line is a line that constitutes a border with an outer side (the side of the atmosphere), and corresponds to the part from the point P1 to the point P3 in the central sealing part 21. The outer peripheral line does not include a portion of the central sealing part 21 at which the peripheral edge 22 is connected, i.e., does not include a portion thereof that is not open to the atmosphere.

The outer peripheral side segment 21c has a convex shape bulging toward the +X-side in the direction of the X-coordinate axis relative to a straight line LN extending in the stacking direction Z through the point P1. Specifically, in the outer peripheral side segment 21c, the value in the X-coordinate axis increases gradually as the value in the Z-coordinate axis decreases. However, the outer peripheral side segment 21c is present on the inner side (on the side of the center point O) of the circle CR.

The outer peripheral side segment 21c can also be defined as follows. Each point in the outer peripheral side segment 21c, i.e., each point (e.g., a point P4 in FIG. 4) on the outer peripheral line within the second angular range β, satisfies a relation expressed by the following Formula (2):

$$L3 < r \quad (2)$$

Here, L3 is a distance from the center point O to each point (e.g., the point P4) on the outer peripheral line. As described above, r is the distance from the center point O to the point P1, i.e., the radius of the circle CR.

Moreover, each point in the outer peripheral side segment 21c, i.e., each point (e.g., the point P4 in FIG. 4) on the outer peripheral line within the second angular range β, is located on the opposite side of the point P1 from the center point O (i.e., on the +X-side) in the direction of the X-coordinate axis. In this embodiment, each point is thus located on the opposite side of the point P1 from the center point O (i.e., on the +X-side) in the direction of the X-coordinate axis, but each point may instead be located at the same position as the point P1 in the direction of the X-coordinate axis. All points or some points in a sequence of points composing the outer peripheral side segment 21c may be located at the same position as the point P1.

Of the outer peripheral upper segment 21a, the outer peripheral intermediate segment 21b, and the outer peripheral side segment 21c, the outer peripheral intermediate segment 21b is farthest away from the center point O. Thus, the outer peripheral intermediate segment 21b can be described as a collection of points at the longest distance (=r) from the center point O in the sequence of points composing the outer peripheral line of the sealing part (these points in the outer peripheral intermediate segment 21b will be hereinafter referred to as "outermost points").

When a compressive force is applied between the anode-side separator 50 and the cathode-side separator 40 of the adjacent other cell 140 in the state shown in FIG. 3, the gasket GK4 is compressed in the stacking direction Z and applies a contact pressure to the separators 40, 50 by a restoring force. Specifically, the central sealing part 21 of the gasket GK4 deforms in the stacking direction Z, and a contact pressure is applied to the separators 40, 50 by the restoring force of the central sealing part 21. As a result, the central sealing part 21 comes in close contact with the surface of the anode-side separator 50 and the surface of the cathode-side separator 40 of the adjacent other cell 140, thereby sealing the gap between the cell 140 and the adjacent other cell 140.

As described above, the peripheral edges 22 are provided on each side of the central sealing part 21. The peripheral edges 22 function so as to limit the extent to which the gasket GK inclines around the axis in the length direction, i.e., function so as to prevent fall of the gasket GK. The peripheral edges 22 do not function so as to come in close contact with the anode-side separator 50 of one cell of two adjacent cells and the cathode-side separator 40 of the other cell.

A-3. Effects

As has been described in detail above, according to the gaskets GK1 to GK5 in this embodiment, the central sealing part 21 has the point P1 that is one point on the outer peripheral line within the angular range of the first quadrant in the cross-section perpendicular to the length direction. Each point (e.g., the point P2) on the outer peripheral line within the first angular range (the range c in FIG. 4) located on the side of 0 degree from the point P1 relative to the Z-axis satisfies the relation expressed by Formula (1). Specifically, the length (distance) L2 from the center point O to each point is equal to or shorter than the distance r from the center point O to the point P1. Thus, in the outer peripheral line within the first angular range (the outer peripheral upper segment 21a and the outer peripheral intermediate segment 21b), there is no part (point) at which the length (distance) L2 from the center point O is longer than the distance from the center point O to the point P1. The part of the outer peripheral intermediate segment 21b except for the point P1 is as far away from the center point O as the point P1, but is not farther away than the point P1.

Figure 5:
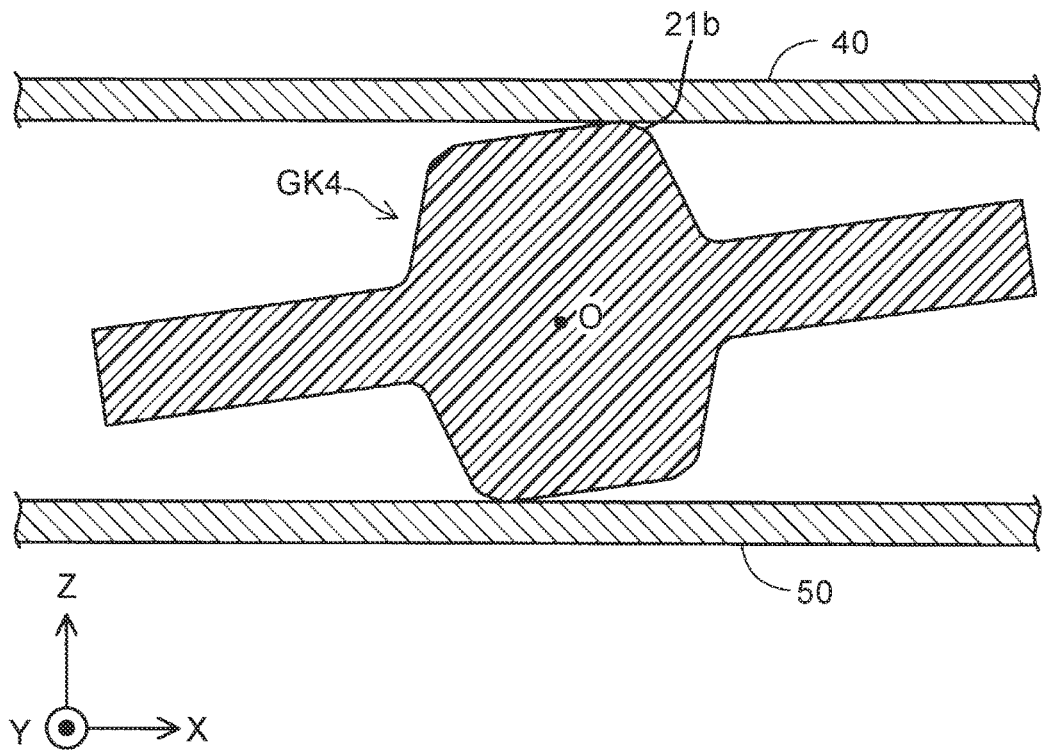
FIG. 5 is a view illustrating a case where the gasket has inclined around an axis in the length direction.

FIG. 5 is a view illustrating a case where the gasket GK4 has inclined around the axis in the length direction. For example, when fastening pressures applied by the four fastening bolts mentioned above are not even, a compressive force may be applied to the gasket GK4 from a direction intersecting the stacking direction Z. In this case, the gasket GK4 may entirely or partially inclines around the axis in the length direction. For example, the gasket GK4 may incline in a counterclockwise direction around the center point O as shown in FIG. 5. According to the gasket GK4 of this embodiment, this inclination causes a direction from the outer peripheral intermediate segment 21b including the point P1 (FIG. 4) toward the center point O to approach the compression direction of the gasket GK4. Thus, even when the gasket GK4 has inclined, a sufficient thickness contributing to the sealing performance can be maintained.

As described with FIG. 4, in the cross-section of the central sealing part 21 perpendicular to the length direction, each point (e.g., the point P4) on the outer peripheral line within the second angular range (the range β in FIG. 4) located on the side of 90 degrees from the point P1 satisfies the relation expressed by Formula (2). Specifically, the distance L3 from the center point O to each point is shorter than the distance r from the center point O to the point P1. Moreover, each point is located on the opposite side of the point P1 from the center point O or at the same position as the point P1 in the direction of the X-coordinate axis. Thus, the gaskets GK1 to GK5 can have the gasket material reliably packed in the compression area as seen from above in the compression direction, and can prevent a decrease in reaction force upon compression.

Thus, even when the gaskets GK1 to GK5 of this embodiment have inclined, the gaskets GK1 to GK5 can maintain portions that come in close contact with the separator 40 and can prevent a decrease in reaction force upon compression, so that a sufficient contact pressure can be applied between the separators 40, 50 of the fuel cell stack 100. As a result, the gaskets GK1 to GK5 can achieve an effect that the adequate sealing performance can be maintained.

Advantages of the gaskets GK1 to GK5 of the embodiment (hereinafter also referred to simply as a "gasket GK") will be further described in comparison with gaskets having other shapes. As described in the section "Summary," the gasket described in JP 2006-4851 A (hereinafter referred to as a "gasket of a first reference example") cannot maintain the adequate sealing performance due to a leading end of the ridge-shaped main lip being displaced from the mating seal surface. By contrast, as described above, the gasket GK of the embodiment can maintain a portion that comes in close contact with the separator 40 even when the gasket GK has inclined, and thus can apply a sufficient contact pressure between cells.

Next, a bonded-type gasket that includes the same ridge-shaped main lip as the above gasket and has a bottom surface bonded to a separator will be described as a gasket of a second reference example. According to this gasket of the second reference example, as the gasket is bonded to the separator, the gasket does not incline between the separators. Accordingly, the gasket of the second reference example can prevent a decrease in contact pressure due to inclination of the gasket. However, to install the gasket of the second reference example, it is necessary to control the surface of the separator, apply an adhesive, and perform a curing step, so that a fuel cell stack takes time and effort to manufacture. By contrast, being an unbonded type, the gasket GK of the embodiment is easy to install, so that a fuel cell stack is easy to manufacture.

Figure 6:
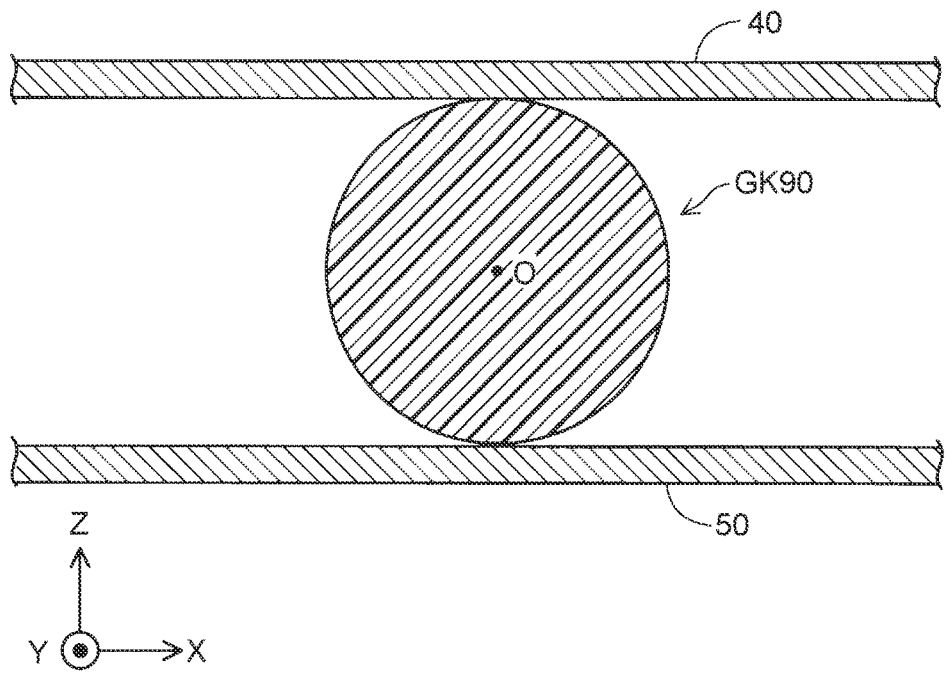
FIG. 6 is a view illustrating a cross-section of a gasket of a third reference example perpendicular to a length direction.

FIG. 6 is a view illustrating a cross-section of a gasket GK90 of a third reference example perpendicular to a length direction. The gasket GK90 has a circular cross-sectional shape. The gasket GK90 is a so-called O-ring. Compared with the gasket GK of the embodiment, the gasket GK90 is wider in the horizontal direction X perpendicular to the stacking direction Z and therefore has a larger volume of gasket material. Accordingly, to deliver high sealing performance, the gasket GK90 of the third reference example needs to be compressed with a large compressive force, which, however, results in higher levels of internal stress and distortion. By contrast, according to the gasket GK of the embodiment, each point in the outer peripheral side segment 21c of the central sealing part 21, i.e., each point on the outer peripheral line within the second angular range β, satisfies the relation (L3<r) expressed by Formula (2), so that the width of the gasket GK in the horizontal direction X is smaller than that of the gasket GK90 of the third reference example. Accordingly, internal stress and distortion of the gasket GK of the embodiment upon high compression can be suppressed to low levels.

Figure 7:
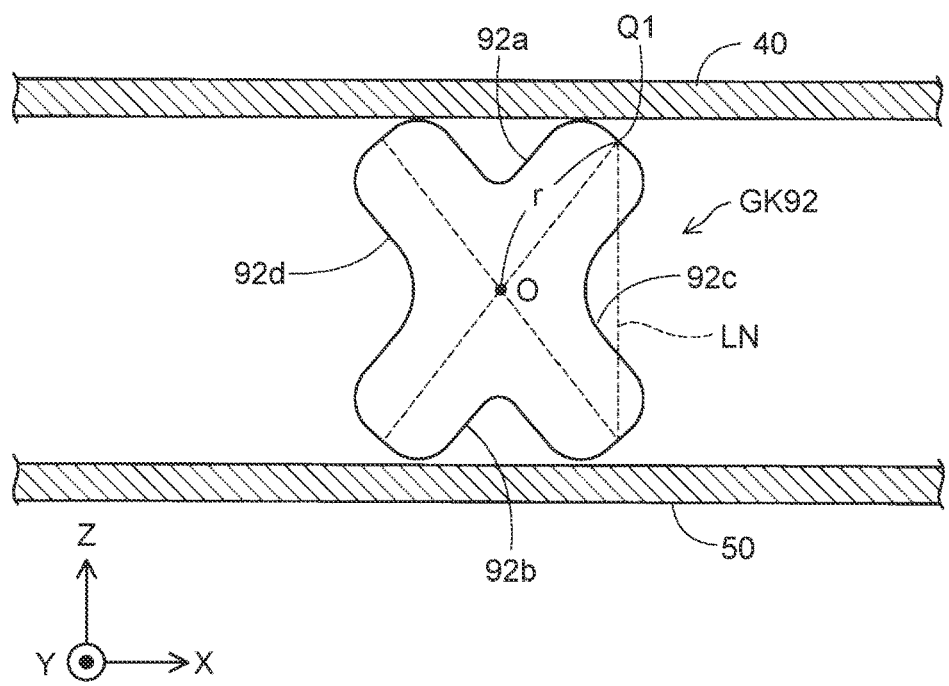
FIG. 7 is a view illustrating a cross-section of a gasket of a fourth reference example perpendicular to a length direction.

FIG. 7 is a view illustrating a cross-section of a gasket GK92 of a fourth reference example perpendicular to a length direction. The cross-section of the gasket GK92 perpendicular to the length direction has an X-shape. Specifically, the gasket GK92 has recesses 92a, 92b, 92c, 92d respectively on both sides in the stacking direction Z and both sides in the horizontal direction X.

When an outer peripheral point at the distance r from the center point O in the first-quadrant portion of the gasket GK92 of the fourth reference example is Q1, the recess 92c is partially located farther on an inner side (the side of the center point O) than the straight line LN extending in the stacking direction Z through the point Q1. Thus, the recess 92c is located on the same side of the point Q1 as the center point O in the direction of the X-coordinate axis. Accordingly, there is a portion of the compression area where the gasket material is absent as seen from above in the compression direction, which causes a decrease in reaction force upon compression. Thus, the gasket GK92 of the fourth reference example cannot exert a high contact pressure upon compression.

By contrast, according to the gasket GK of the embodiment, as shown in FIG. 4, each point in the outer peripheral side segment 21c, i.e., each point on the outer peripheral line within the second angular range β, is located on the opposite side of the point P1 from the center point O in the direction of the X-coordinate axis, so that the gasket material can be reliably packed in the compression area as seen from above in the compression direction. Accordingly, the gasket GK of the embodiment can prevent a decrease in reaction force upon compression. Thus, the gasket GK of the embodiment can exert a high contact pressure upon compression.

B. Modified Example of First Embodiment

Figure 8:
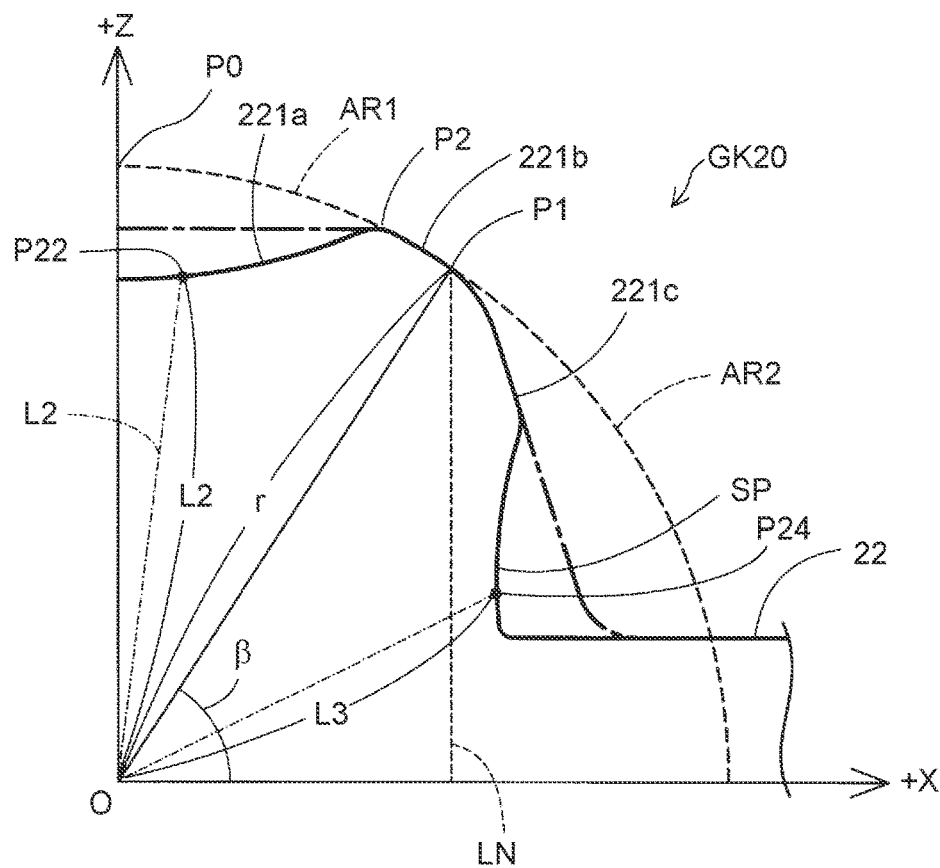
FIG. 8 is a view illustrating a part of a gasket in a first modified example of the first embodiment.

FIG. 8 is a view illustrating a part of a gasket GK20 in a first modified example of the first embodiment. FIG. 8 shows only the first-quadrant portion in the cross-section perpendicular to the length direction. Except that a central sealing part 221 has a different cross-sectional shape, the gasket GK20 of the first modified example is the same as the gasket GK of the first embodiment. The one-dot dashed line in FIG. 8 indicates the outer peripheral line of the central sealing part 21 of the first modified example. Components of the first modified example that are the same as in the first embodiment will be denoted by the same reference signs while the description thereof will be omitted.

As in the first embodiment, the outer peripheral line of the central sealing part 221 in the first modified example is composed of an outer peripheral upper segment 221a, an outer peripheral intermediate segment 221b, and an outer peripheral side segment 221c. The outer peripheral intermediate segment 221b has the same shape as the outer peripheral intermediate segment 21b of the first embodiment. The outer peripheral upper segment 221a has a shape recessed toward a minus side of the Z-coordinate axis relative to a straight line parallel to the X-coordinate axis.

The outer peripheral side segment 221c has a shape that bulges toward the plus side of the Z-coordinate axis and has a recess SP at a central part of the bulge. The recess SP has such a depth as not to be located farther on the side of the center point O than the straight line LN extending in the stacking direction Z through the point P1 on the outer peripheral intermediate segment 221b on the +X-side. Thus, each point in the outer peripheral side segment 221c, i.e., each point (e.g., a point P24) on the outer peripheral line within the second angular range β, is located on the opposite side of the point P1 from the center point O or at the same position as the point P1 in the direction of the X-coordinate axis. Moreover, the outer peripheral side segment 221c has such a shape as to be present on an inner side (the side of the center point O) of an arc AR2 that is centered at the center point O and has the radius r. Thus, each point in the outer peripheral side segment 221c, i.e., each point (e.g., the point 24) on the outer peripheral line within the second angular range β satisfies the relation (L3<r) expressed by Formula (2).

Like the gasket GK of the first embodiment, the gasket GK20 of the first modified example can maintain a portion that comes in close contact with the separator 40 and can prevent a decrease in reaction force upon compression when the gasket has inclined, so that a sufficient contact pressure can be applied between the separators 40, 50 of the fuel cell stack 100.

While both the outer peripheral upper segment 221a and the outer peripheral side segment 221c of the gasket GK20 of the first modified example are different from those of the gasket GK of the first embodiment, only either the outer peripheral upper segment 221a or the outer peripheral side segment 221c of the gasket GK20 may be different from that of the gasket GK.

The shape of the outer peripheral upper segment 221a is not limited to the shape in the first modified example but can be changed to various shapes. For example, the outer peripheral upper segment 221a may have a shape in which recesses and protrusions are repeated. In essence, the shape of the outer peripheral upper segment 221a can be changed to any shape that is present on an inner side of an arc AR1 (the arc from a point P0 to the point P1 in FIG. 8) that is centered at the center point O and has the radius r, including positions on the arc AR1. The point P0 is a point intersecting the +Z-coordinate axis. Here, being present on the inner side of the arc AR1 including the positions on the arc AR1 includes a case where the entire outer peripheral upper segment 221a is present on the arc AR1, a case where the entire outer peripheral upper segment 221a is located on the inner side of the arc AR1, and a case where a part of the outer peripheral upper segment 221a is present on the arc AR1 and the rest is present on the inner side of the arc. In essence, the outer peripheral upper segment 221a has such a shape as not to be present on an outer side of the arc AR1. In other words, each point (e.g., a point P22) in the outer peripheral upper segment 221a should satisfy the relation (L2≤r) expressed by Formula (1). Points within the ranges of the outer peripheral upper segment 221a and the outer peripheral intermediate segment 221b that do not include the point P1 should also satisfy the relation (L2≤r) expressed by Formula (1).

The shape of the outer peripheral side segment 221c is not limited to the shape in the first modified example but can be changed to various shapes. For example, the outer peripheral side segment 221c may have a shape in which two or more sets of recess and protrusion are repeated. In essence, the shape of the outer peripheral side segment 221c can be changed to any shape that is present in a region from the inner side of the arc AR2 that is centered at the center point O and has the radius r to the straight line LN extending in the stacking direction Z through the point P1 that is the end on the +X-side of the outer peripheral intermediate segment 221b. "The inner side of the arc AR2" does not include positions on the arc AR2. "To the straight line LN" includes positions on the straight line LN. Accordingly, the shape of the outer peripheral side segment 221c falls outside the acceptable range if at least a part of the shape is in contact with the arc AR2, and falls inside the acceptable range if a part or the whole of the shape is in contact with the straight line LN. For example, the outer peripheral side segment 221c may have a shape that extends sharply downward from the point P1 along the straight line LN. In other words, each point (e.g., the point P24) in the outer peripheral side segment 221c can be located at any position, provided that each point satisfies the relation (L3<r) expressed by Formula (2) and that each point in the outer peripheral side segment 221c is located on the opposite side of the point P1 from the center point O or at the same position as the point P1 in the direction of the X-coordinate axis.

In the first embodiment and the first modified example of the first embodiment, in the cross-sections of the central sealing parts 21, 221 perpendicular to the length direction, the first-quadrant portion and the second-quadrant portion are line-symmetrical with respect to the Z-coordinate axis, the first-quadrant portion and the third-quadrant portion are point-symmetrical with respect to the center point O, and the first-quadrant portion and the fourth-quadrant portion are line-symmetrical with respect to the X-coordinate axis. As a modified example in this respect, the cross-sections may have a shape in which the second-quadrant portion is line-symmetrical with the first-quadrant portion with respect to the Z-coordinate axis while the third-quadrant portion and the fourth-quadrant portion have no relation with the first-quadrant portion. The second-quadrant portion may also have no relation with the first-quadrant portion, either. Moreover, it is not absolutely necessary to apply the cross-sectional shape of the present disclosure to the first quadrant, and the cross-sectional shape may be applied to the second quadrant without being applied to the first quadrant. Alternatively, the cross-sectional shape may be applied to the third quadrant or to the fourth quadrant.

Next, a second modified example of the first embodiment will be described. Except that the outer peripheral intermediate segment has a different shape, a gasket of the second modified example (not shown) is the same as the gasket GK of the first embodiment. While the outer peripheral intermediate segment 21b of the gasket GK of the first embodiment has the arc shape extending from the point P1 to the point P2 (see FIG. 4), the outer peripheral intermediate segment of the gasket of the second modified example is composed of a single point, the point P1. According to this configuration, the outer peripheral upper segment 21a can be regarded as the "first outer peripheral line".

Like the gasket GK of the first embodiment, the gasket of the second modified example can maintain a portion that comes in close contact with the separator 40 and prevent a decrease in reaction force upon compression when the gasket has inclined, so that a sufficient contact pressure can be applied between the separators 40, 50 of the fuel cell stack 100.

C. Second Embodiment

Figure 9:
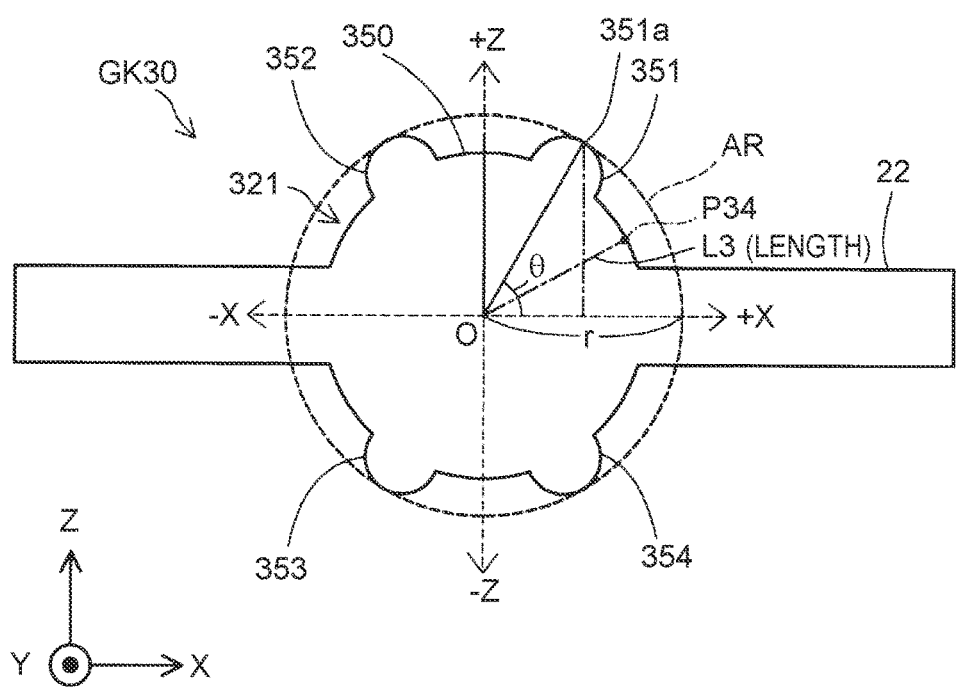
FIG. 9 is a view illustrating a gasket in a second embodiment of the present disclosure.

FIG. 9 is a view illustrating a gasket GK30 in a second embodiment of the present disclosure. FIG. 9 shows a cross-section perpendicular to the length direction. Except that a central sealing part 321 has a different cross-sectional shape, the gasket GK30 of the second embodiment is the same as the gasket GK of the first embodiment. Components of the second embodiment that are the same as in the first embodiment will be denoted by the same reference signs while the description thereof will be omitted.

The central sealing part 321 of the gasket GK30 of the second embodiment includes an O-ring portion 350 having a circular cross-sectional shape, and first to fourth protrusions 351 to 354 having a substantially semicircular cross-sectional shape. The first to fourth protrusions 351 to 354 are disposed on an outer periphery of the O-ring portion 350, and are formed integrally with the O-ring portion 350. When an X-coordinate axis and a Z-coordinate axis are drawn in FIG. 9 as in FIG. 4 of the first embodiment, the shape and the position of the second protrusion 352 located in the second quadrant are line-symmetrical with those of the first protrusion 351 located in the first quadrant with respect to the Z-coordinate axis. The shape and the position of the third protrusion 353 located in the third quadrant are point-symmetrical with those of the first protrusion 351 with respect to the center point O. The shape and the position of the fourth protrusion 354 located in the fourth quadrant are line-symmetrical with those of the first protrusion 351 with respect to the X-coordinate axis. In the following, the cross-sectional shape of the central sealing part 321 will be described using the first protrusion 351 as a representative.

In the first quadrant of the cross-section, an apex 351a of the first protrusion 351 is an outer peripheral point at which the distance from the center point O is r. The apex 351a is present inside the first quadrant as an outermost point that is farthest away from the center point O. Thus, even when the gasket GK20 has inclined around the axis in the length direction, a portion that comes in close contact with the separator 40 can be maintained.

Figure 10:
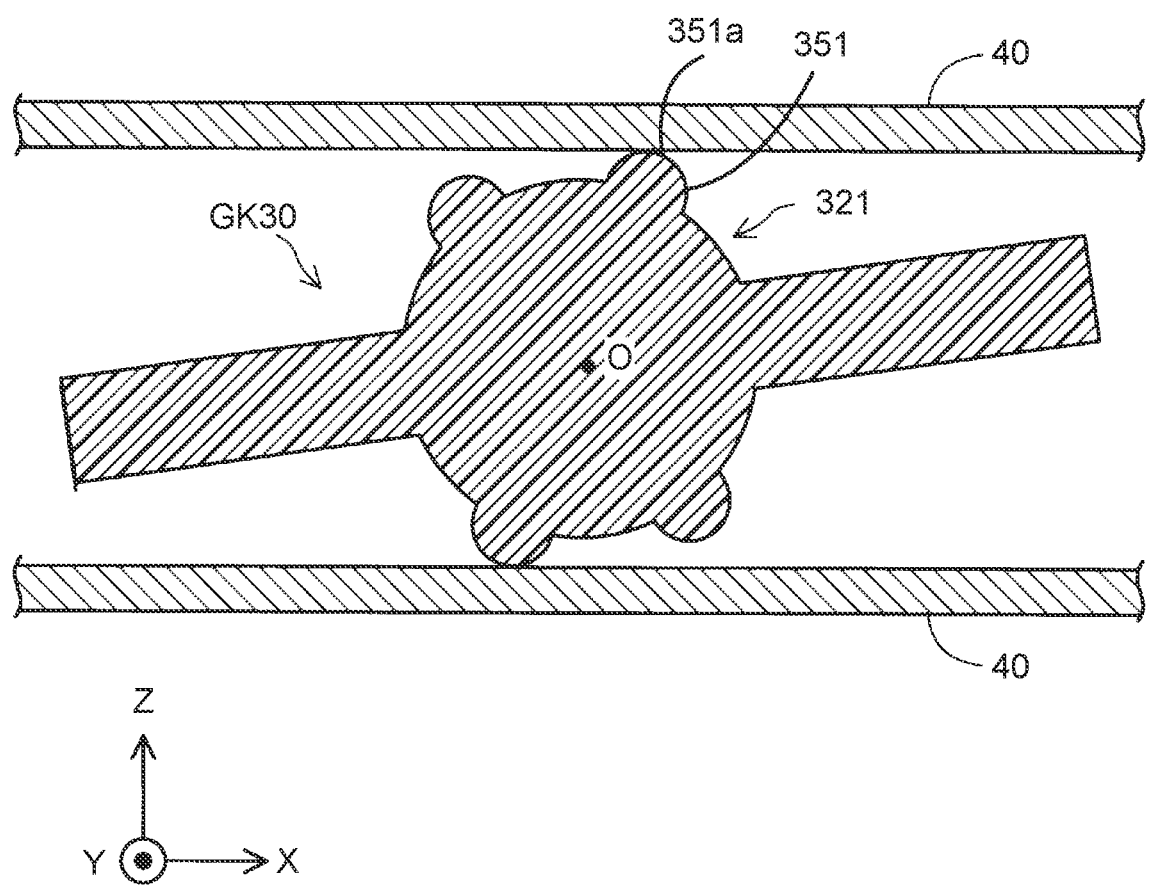
FIG. 10 is a view illustrating a case where the gasket of the second embodiment has inclined around an axis in a length direction.

FIG. 10 is a view illustrating a case where the gasket GK30 of the second embodiment has inclined around the axis in the length direction. For example, the gasket GK30 may incline in a counterclockwise direction around the center point O as shown in FIG. 10. This inclination causes a direction from the apex 351a of the first protrusion 351 toward the center point O to approach the compression direction Z of the gasket GK30. Thus, even when the gasket GK30 has inclined, a portion that comes in close contact with the separator 40 can be maintained.

Moreover, according to the central sealing part 321 with the above configuration, in the cross-section perpendicular to the length direction, the outer peripheral line of the central sealing part 321 within an angular range (a range θ in FIG. 9) defined by the Z-coordinate axis and a direction oriented from the center point O toward the apex 351a is present in a region from an inner side of an arc AR that is centered at the center point O and has the radius r as a distance between the center point O and the apex 351a to the straight line LN extending in the stacking direction Z through the apex 351a. In other words, each point (e.g., a point P34 in FIG. 9) on the outer peripheral line within this angular range (the range θ in FIG. 9) satisfies the relation (L3<r) expressed by Formula (2). Thus, the gasket GK30 can have the gasket material reliably packed in the compression area as seen from above in the compression direction, and can prevent a decrease in reaction force upon compression.

Thus, according to the gasket GK30 of the second embodiment, a portion that comes in close contact with the separator 40 can be maintained and a decrease in reaction force upon compression can be prevented even when the gasket GK30 has inclined, so that a sufficient contact pressure can be applied between the separators 40, 50 of the fuel cell stack 100. As a result, as in the first embodiment, the gasket GK30 can achieve an effect that the adequate sealing performance can be maintained.

D. Modified Example of Second Embodiment

Figure 11:
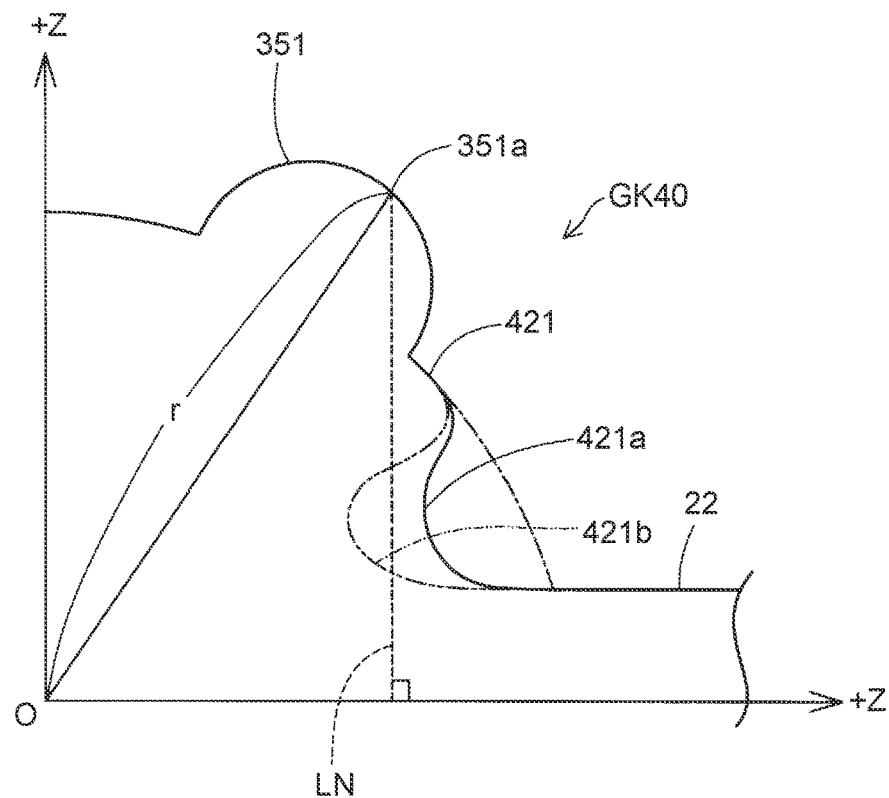
FIG. 11 is a view illustrating a part of a gasket in a first modified example of the second embodiment.

FIG. 11 is a view illustrating a part of a gasket GK40 in a first modified example of the second embodiment. FIG. 11 shows only the first-quadrant portion of the cross-section perpendicular to the length direction. Except that a central sealing part 421 has a different cross-sectional shape, the gasket GK40 of the first modified example of the second embodiment is the same as the gasket GK30 of the second embodiment. The one-dot dashed line in FIG. 11 indicates the outer peripheral line of the central sealing part 321 of the second embodiment. Components of the first modified example of the second embodiment that are the same as in the second embodiment will be denoted by the same reference signs while the description thereof will be omitted.

The outer peripheral line of the central sealing part 321 of the second embodiment has a shape in which the protrusions 351 to 354 are disposed on the O-ring portion 350 (see FIG. 9). By contrast, the outer peripheral line of the central sealing part 421 of the first modified example of the second embodiment has the same first protrusion 351 as in the second embodiment disposed at a part of the shape that has a recess 421a recessed from a circle. The recess 421a is located at a part close to the peripheral edge 22 and recessed toward the minus side of the Z-coordinate axis. The recess 421a has such a depth as not to be present farther on the side of the center point O than the straight line LN extending in the stacking direction Z through the apex 351a of the first protrusion 351. A recess 421b in FIG. 11 is an example not applicable to the present disclosure, and is partially located farther on the side of the center point O than the straight line LN.

While only the first-quadrant portion is shown in FIG. 11, the second-quadrant portion is line-symmetrical with the first-quadrant portion with respect to the Z-coordinate axis, the third-quadrant portion is point-symmetrical with the first-quadrant portion with respect to the center point O, and the fourth-quadrant portion is line-symmetrical with the first-quadrant portion with respect to the X-coordinate axis.

Like the gasket GK30 of the second embodiment, the gasket GK40 of the first modified example of the second embodiment configured as has been described above can have the gasket material reliably packed in the compression area as seen from above in the compression direction, and can prevent a decrease in reaction force upon compression.

In the second embodiment and the first modified example of the second embodiment, in the cross-sections of the central sealing parts 321, 421 perpendicular to the length direction, the first-quadrant portion and the second-quadrant portion are line-symmetrical with respect to the Z-coordinate axis, the first-quadrant portion and the third-quadrant portion are point-symmetrical with respect to the center point O, and the first-quadrant portion and the fourth-quadrant portion are line-symmetrical with respect to the X-coordinate axis. As a modified example in this respect, the cross-sections may have a shape in which the second-quadrant portion is line-symmetrical with the first-quadrant portion with respect to the Z-coordinate axis while the shape of the third-quadrant portion and the shape of the fourth-quadrant portion have no relation with the first-quadrant portion. The shape of the second-quadrant portion may also have no relation with the shape of the first-quadrant portion, either. Moreover, it is not absolutely necessary to apply the cross-sectional shape of the present disclosure to the first quadrant, and the cross-sectional shape may be applied to the second quadrant without being applied to the first quadrant. Alternatively, the cross-sectional shape may be applied to the third quadrant or the fourth quadrant.

Figure 12:
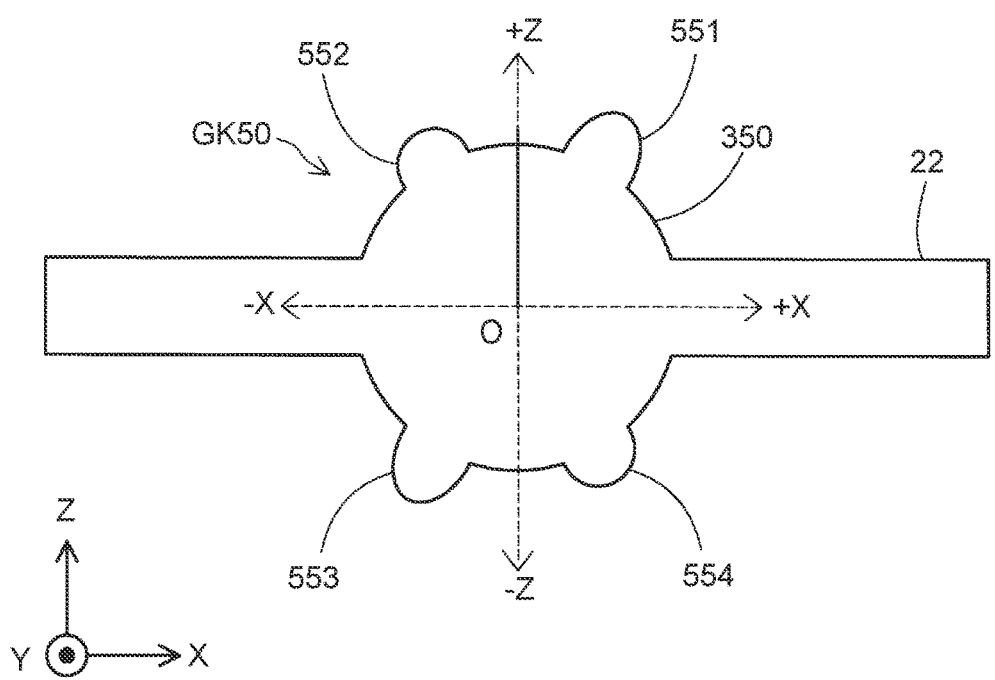
FIG. 12 is a view illustrating a gasket in a second modified example of the second embodiment.

FIG. 12 is a view illustrating a gasket GK50 in a second modified example of the second embodiment. In the cross-section of the gasket GK50 of the second modified example perpendicular to the length direction, a first protrusion 551 located in the first quadrant and a third protrusion 553 located in the third quadrant are point-symmetrical with respect to the center point O, and a second protrusion 552 located in the second quadrant and a fourth protrusion 554 located in the fourth quadrant are point-symmetrical with respect to the center point O. The first protrusion 551 located in the first quadrant protrudes to a greater extent than the second protrusion 552 located in the second quadrant. The second modified example is otherwise the same as the second embodiment. Components of the second modified example of the second embodiment that are the same as in the second embodiment will be denoted by the same reference signs while the description thereof will be omitted.

As in the second embodiment, the gasket GK50 of the second modified example with the above configuration can achieve an effect that the adequate sealing performance can be maintained.

E. Third Embodiment

Figure 13:
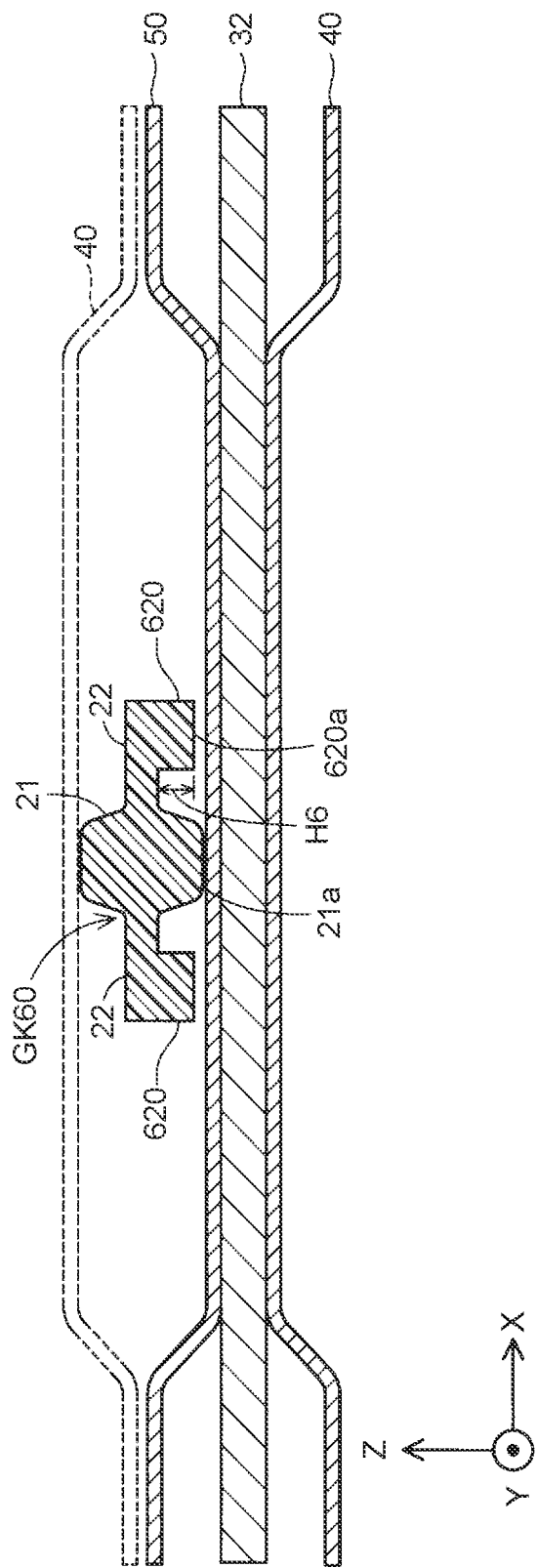
FIG. 13 is a view illustrating an anode-side separator with a gasket of a third embodiment disposed thereon.

FIG. 13 is a view illustrating the anode-side separator 50 with a gasket GK60 of a third embodiment disposed thereon. FIG. 13 is a sectional view from the same direction as in FIG. 3 of the first embodiment. As shown in FIG. 13, the gasket GK60 of the third embodiment is different from the gasket GK of the first embodiment in that fall prevention portions 620 are provided respectively on the peripheral edges 22 that are provided on both sides of the central sealing part 21. The other components (the central sealing part 21 and the peripheral edges 22) of the gasket GK60 in the third embodiment are the same as those of the fuel cell stack 100 in the first embodiment, and therefore the same components in FIG. 13 will be denoted by the same reference signs as in FIG. 3 while the description thereof will be omitted.

The fall prevention portion 620 is an elongated member (protrusion) having a rectangular cross-sectional shape, and is provided on a surface of each peripheral edge 22 facing the anode-side separator 50. Specifically, the fall prevention portions 620 are provided on both sides in the horizontal direction X in the surfaces of the peripheral edges 22 facing the anode-side separator 50. A length H6 of the fall prevention portion 620 in the stacking direction Z is shorter than a height (a distance in the direction of the Z-coordinate axis) from the surface of the peripheral edge 22 to the outer peripheral upper segment 21a of the central sealing part 21. Thus, an end surface 620a facing the anode-side separator 50 in the stacking direction Z is located at a higher position in the direction of the Z-coordinate axis than the outer peripheral upper segment 21a of the central sealing part 21.

Compared with the gasket GK of the first embodiment that is not provided with the fall prevention portions 620, the gasket GK60 of the third embodiment configured as has been described above can further limit the extent to which the gasket GK60 inclines around the axis in the length direction by the actions of the fall prevention portions 620. Since the fall prevention portions 620 are provided on only the surfaces of the peripheral edges 22 facing the anode-side separator 50, the fall prevention portions 620 do not serve to seal the gap between the separators 40, 50 when a compressive force is applied between the anode-side separator 50 and the cathode-side separator 40.

F. Modified Example of Third Embodiment

FIG. 14 is a view illustrating a part of a gasket GK70 in a modified example of the third embodiment. The gasket GK70 is different from the gasket GK60 of the third embodiment in that fall prevention portions 720, 722 are provided respectively on both surfaces of each peripheral edge 22 in the stacking direction. The other components (the central sealing part 21 and the peripheral edges 22) of the gasket GK70 in the third embodiment are the same as those of the gasket GK60 in the third embodiment, and therefore the same components in FIG. 14 will be denoted by the same reference signs as in FIG. 1 while the description thereof will be omitted.

The fall prevention portion 720 located on the side of the anode-side separator 50 is an elongated member having a rectangular cross-sectional shape. The fall prevention portion 720 is different from the fall prevention portion 620 in the third embodiment only in that the fall prevention portion 720 has a smaller thickness (length in the stacking direction Z), while the length in the horizontal direction X and the mounting position in the peripheral edge 22 of the fall prevention portion 720 are the same as those of the fall prevention portion 620. The fall prevention portion 722 located on the side of the cathode-side separator 40 has the same shape as the fall prevention portion 720 located on the side of the anode-side separator 50, and is provided at a position line-symmetrical with the fall prevention portion 720 with respect to the peripheral edge 22.

Compared with the gasket GK of the first embodiment that is not provided with the fall prevention portions 720, 722, the gasket GK70 of the modified example of the third embodiment configured as has been described above can further limit the extent to which the gasket GK70 inclines around the axis in the length direction by the actions of the fall prevention portions 720, 722. Moreover, compared with the gasket GK60 of the third embodiment, the gasket GK70 of this modified example is provided with the fall prevention portions 720, 722 on both surfaces of the peripheral edges 22 in the stacking direction, and therefore can more reliably fulfill the fall prevention function.

The fall prevention portions 620, 720, 722 of the third embodiment and the modified example of the third embodiment have rectangular cross-sectional shapes. Alternatively, the fall prevention portions may have other cross-sectional shapes such as a semicircular shape and a triangular shape. In essence, the cross-sectional shapes can be changed to any shape that protrudes in the stacking direction Z from one surface of the peripheral edge 22.

The present disclosure is not limited to the above embodiments but can be realized in various other configurations within the scope of the gist of the disclosure. For example, to solve a part or the whole of the problem described above, or to achieve some or all of the effects described above, the technical features in the embodiments corresponding to the technical features in the aspects described in the section "Summary" can be substituted or combined as appropriate. Unless described in the independent claim, the components in the embodiments are supplemental components and can be omitted as appropriate.

What is claimed is:

1. A gasket that is disposed unbonded between separators of two cells of a fuel cell stack adjacent to each other in a stacking direction and seals a gap between the separators, the gasket comprising a sealing part that comes in close contact with the two separators, wherein:
   in a cross-section perpendicular to a length direction of the sealing part, the sealing part has an outer peripheral point that
      is one point on an outer peripheral line of the sealing part within a right angular range from 0 degree to 90 degrees around a center point of the sealing part relative to the stacking direction, the outer peripheral point being located at an angle greater than zero relative to the stacking direction within the right angular range,
   the sealing part includes an O-ring portion having a circular cross-sectional shape and first protrusions provided on an outer periphery of the O-ring portion, each of the first protrusions having a line-symmetrical cross-sectional shape, and
   the outer peripheral point is an apex of at least one of the first protrusions, the apex being an outermost point that is farthest away from the center point in a sequence of points composing the outer peripheral line of the sealing part.

2. The gasket according to claim 1, wherein
   when a plane of coordinates having an origin at the center point is assumed in the cross-section, the right angular range corresponds to a first quadrant located on an upper right side in the plane of coordinates, and
   a portion of the sealing part included in a second quadrant located on an upper left side is line-symmetrical with a portion of the sealing part included in the first quadrant.

3. The gasket according to claim 1, further comprising plate-shaped peripheral edges that are provided on each side of the sealing part in the direction perpendicular to the stacking direction.

4. The gasket according to claim 3, further comprising a second protrusion that protrudes in the stacking direction from a surface of the peripheral edge.

5. The gasket according to claim 1, wherein
   each of the first protrusions has a semicircular cross-sectional shape.

6. The gasket according to claim 1, wherein
   a shape and a position of one of the first protrusions are line-symmetrical with a shape and a position of another one of the first protrusions.

7. The gasket according to claim 1, wherein
   a shape and a position of one of the first protrusions are point-symmetrical with a shape and a position of another one of the first protrusions.

8. The gasket according to claim 1, wherein
   the first protrusions and recesses are alternately provided on the outer periphery of the O-ring portion.

9. A fuel cell stack in which a plurality of cells are stacked in a stacking direction, the fuel cell stack comprising the gasket according to claim 1 that is disposed unbonded between separators of two cells adjacent to each other in the stacking direction.

* * * * *